(12) United States Patent
Iba

(10) Patent No.: US 9,499,100 B2
(45) Date of Patent: Nov. 22, 2016

(54) VEHICLE MIRROR APPARATUS

(71) Applicant: MURAKAMI CORPORATION, Shizuoka (JP)

(72) Inventor: Ryosuke Iba, Fujieda (JP)

(73) Assignee: MURAKAMI CORPORATION, Shizuoka (JP)

( * ) Notice: Subject to any disclaimer, the term of this patent is extended or adjusted under 35 U.S.C. 154(b) by 126 days.

(21) Appl. No.: 14/183,899

(22) Filed: Feb. 19, 2014

(65) Prior Publication Data

US 2014/0233124 A1 Aug. 21, 2014

(30) Foreign Application Priority Data

Feb. 20, 2013 (JP) .................................. 2013-030758

(51) Int. Cl.
*G02B 7/182* (2006.01)
*B60R 1/06* (2006.01)
*B60R 1/072* (2006.01)

(52) U.S. Cl.
CPC *B60R 1/06* (2013.01); *B60R 1/072* (2013.01)

(58) Field of Classification Search
CPC ......... B60R 1/072; B60R 1/07; B60R 1/064; B60R 1/066; B60R 1/068; B60R 1/06; B60R 1/04; B60R 1/062; B60R 1/076; B60R 1/00; B60R 1/02; B60R 1/0615; B60R 1/0625; B60R 2011/0026; B60R 2011/0033; G02B 5/08
USPC ................................................. 359/872–877
See application file for complete search history.

(56) References Cited

U.S. PATENT DOCUMENTS

| | | | |
|---|---|---|---|
| 6,412,960 B1 * | 7/2002 | Yoshida | B60R 1/072 248/481 |
| 7,137,717 B2 | 11/2006 | Ohashi | |
| 2004/0114261 A1 | 6/2004 | Ohashi | |
| 2005/0225886 A1 * | 10/2005 | Yamada | B60R 1/072 359/877 |
| 2007/0035865 A1 | 2/2007 | Ohashi | |

FOREIGN PATENT DOCUMENTS

| | | |
|---|---|---|
| JP | 2001-294091 A | 10/2001 |
| JP | 2004-175260 | 6/2004 |
| JP | 2007-168627 | 7/2007 |

OTHER PUBLICATIONS

Official Action, along with English-language translation thereof, for JP Appl. No. 2013-030758 dated Aug. 9, 2016.

* cited by examiner

*Primary Examiner* — Scott J Sugarman
*Assistant Examiner* — Mustak Choudhury
(74) *Attorney, Agent, or Firm* — Greenblum & Bernstein, P.L.C.

(57) ABSTRACT

The need for an O ring cover is eliminated when a gap between a shaft portion of a mover for mirror surface angle detection and a hole in a sensor case is sealed using an O ring. An O ring that allows a shaft portion of a slide block to be inserted therethrough is interposed between a sensor case and an actuator housing. The sensor case and the actuator housing are interconnected by means of screw-fastening via screws, and the O ring is brought into pressure contact with and held between the sensor case and the actuator housing by means of the screw fastening forces.

9 Claims, 11 Drawing Sheets

VEHICLE MIRROR APPARATUS

The disclosure of Japanese Patent Application No. JP2013-030758 filed on Feb. 20, 2013 including the specification, drawings, claims and abstract is incorporated herein by reference in its entirety.

BACKGROUND OF THE INVENTION

1. Field of the Invention

The present invention relates to a vehicle mirror apparatus having a structure that seals a gap between a shaft portion of a mover and a hole in a sensor case in a mirror surface angle detection device for the vehicle mirror apparatus, the mirror surface angle detection device having a structure in which a mover for mirror surface angle detection projects from the hole in the sensor case in such a manner that the mover is movable in an axial direction thereof. The seal structure of the present invention eliminates the need for an O ring cover, which is needed in a conventional structure.

2. Description of the Related Art

In vehicle mirror apparatuses including a tilting device (mirror surface angle adjustment actuator), a mirror surface angle detection device is installed in, e.g., what is called a memory mirror or what is called a reverse interlock mirror. A memory mirror is a mirror that automatically adjusts a mirror surface angle to a prestored angle. A reverse interlock mirror is a mirror that in association with gear shift operation means of the vehicle being thrown into a reverse position, automatically rotates a mirror surface of a vehicle outside mirror downward by a predetermined amount of angle to enable a driver to view an area around the rear wheel. As a conventional mirror surface angle detection device for a vehicle mirror apparatus, there is one described in Japanese Patent Laid-Open No. 2001-294091. FIG. 12 illustrates the mirror surface angle detection device described in Japanese Patent Laid-Open No. 2001-294091. In a mirror surface angle detection device 200, rod-like movers 204 and 206 are biased by respective springs 208 and 210 and housed in a case body 202 of a sensor case 201 in such a manner that the movers 204 and 206 are movable in respective axial directions. Shaft portions of the movers 204 and 206 project to the outside of the sensor case 201 from respective holes 212 and 214 in the case body 202 in such a manner that the shaft portions are movable in the respective axial directions. Contact members 216 and 218 are attached to respective rear end portions of the movers 204 and 206. A print wiring board 224 with resistors 220 and 222 printed on a surface thereof is housed in the case body 202. The contact members 216 and 218 are in contact with the resistors 220 and 222, respectively, and along with movement of the movers 204 and 206, slide respective surfaces of the resistors 220 and 222. A lower opening 202a of the case body 202 is occluded by attaching a case cover 226 to the case body 202 via screws 227. The case body 202 and the case cover 226 provide the sensor case 201. Balls 205 and 207 are attached to respective tips of the movers 204 and 206 biased by the springs 208 and 210. The balls 205 and 207 press and abut against respective positions in a back side of a mirror (not illustrated), the positions being off a tilting center. Upon the mirror being tilted vertically and horizontally with the tilting center as a center as a result of being driven by respective motors (not illustrated), the movers 204 and 206 move following the mirror in the respective axial directions. Along with the movement of the movers 204 and 206, positions where the contact member 216 and 218 are in contact with the respective resistors 220 and 222 change, and thus, the contact positions are detected as voltage values through a connector 228, whereby respective mirror surface angles in the vertical and horizontal directions are detected. Structures that seals gaps between the shaft portions of the movers 204 and 206 and the holes 212 and 214 in the case body 202 are configured as follows. At an upper surface of the case body 202, circular walls 230 and 232 are formed so as to surround the holes 212 and 214. In respective spaces inside the walls 230 and 232, respective O rings 234 and 236 are arranged, and O ring covers 238 and 240 are further fitted in the respective spaces. Vertical holes 238b and 240b are formed in the respective O ring covers 238 and 240. On the case body 202, projections 239 are formed at respective positions corresponding to the holes 238b and 240b. The projections 239 are put in the respective holes 238b and 240b and respective upper ends of the projections 239 that project above the holes 238b and 240b are crushed by thermal caulking, whereby the O ring covers 238 and 240 are fixedly attached to the case body 202. Here, the O rings 234 and 236 are held between the upper surface of the case body 202 and respective lower surfaces of the O ring covers 238 and 240. The shaft portions of the movers 204 and 206 project to the outside of the mirror surface angle detection device 200 through the center holes 234a and 236a in the O rings 234 and 236 and the center holes 238a and 240a in the O ring covers 238 and 240, respectively. Gaps between the shaft portions of the movers 204 and 206 and the holes 212 and 214 in the case body 202 are sealed by the O rings 234 and 236, respectively, and thus, intrusion of water into the sensor case 201 through the gaps is blocked. When the movers 204 and 206 are moved in the respective axial directions, outer peripheral surfaces of the shaft portions of the movers 204 and 206 slide on respective inner peripheral surfaces of the center holes 234a and 236a in the O rings 234 and 236.

A tilting device for a vehicle mirror apparatus equipped with a mirror surface angle detection device having a structure similar to that in FIG. 12 has been put into practical use. FIGS. 13A and 13B are schematic diagrams of the tilting device. In a tilting device 242, a tilting member 246 is supported on a housing 244 (base member) so as to be tiltable in vertical and horizontal directions. A mirror holder (not illustrated) that holds a mirror is attached to a front surface of the tilting member 246. By means of driving motors housed in an actuator housing 244 and drive devices that each include a transmission mechanism, the tilting member 246 vertically and horizontally tilts relative to the actuator housing 244. A mirror surface angle detection device 200' having a structure similar to that in FIG. 12 is attached to a back surface of the actuator housing 244 by means of engagement using lugs (not illustrated). Movers in the mirror surface angle detection device 200' (corresponding to the movers 204 and 206 in FIG. 12) penetrate the actuator housing 244 and balls attached to respective tips of the movers (corresponding to balls 205 and 207 in FIG. 12) press and abut against a back surface of the tilting member 246. FIG. 14 illustrates a seal structure in the mirror surface angle detection device 200' in FIG. 13. Parts that are in common with the mirror surface angle detection device 200 in FIG. 12 are provided with reference numerals that are the same as those of the mirror surface angle detection device 200. At a surface of the actuator housing 244 that faces a case body 202, a circular wall 230' is formed so as to surround a hole 212. An O ring 234 is arranged in a space inside the wall 230', and an O ring cover 238' is further put on the O ring 234. Vertical holes 238b are formed in the O ring cover 238'. Projections 239 are formed at respective positions in the case body 202 corresponding to the respective holes 238b. The projections 239 are put into the holes 238b. Extremity portions 239a of the projections 239 that project from the holes 238b are crushed by means of thermal caulking, whereby the O ring cover 238' is fixedly attached to the case body 202. Here, the O ring 234 is held between surfaces of the case body 202 and the O ring cover 238' that face each other. A shaft portion of a mover 204 projects to the outside of the mirror surface angle detection device 200' through a center hole 234a of the O ring 234 and a center hole 238a of the O ring cover 238'. The shaft portion further penetrates the actuator housing 244 through a hole 244a in the actuator housing 244, and a ball attached to a tip of the shaft portion against (corresponding to the ball 205 in FIG. 12) presses and abuts the back surface of the tilting member 246 (FIG. 13). A gap G between the shaft portion of the mover 204 and the hole 212 in the case body 202 is sealed by the O ring 234, and thus, intrusion of water into a sensor case 201 through the gap G is blocked. When the mover 204 moves in an axial direction thereof, an outer peripheral surface of the shaft portion of the mover 204 slides on an inner peripheral surface of the center hole 234a of the O ring 234.

The seal structure in FIG. 14 requires the O ring cover 238', resulting in the problem of an increase in the number of components by that amount. Also, a process of assembling the mirror surface angle detection device 200' requires a step of fixing the O ring cover 238' to the case body 202 by means of thermal caulking. Furthermore, there is the problem of an increase in the entire thickness of the combination of the tilting device 242 and the mirror surface angle detection device 200' by the thickness of the O ring cover 238'.

The present invention is intended to solve the aforementioned problems of the conventional techniques, and is intended to provide a vehicle mirror apparatus having a seal structure that eliminates the need for an O ring cover.

SUMMARY OF THE INVENTION

In one aspect of the present invention, a vehicle mirror apparatus according to the present invention comprising: a tilting device tilting a mirror to adjust a tilting angle of the mirror; and a mirror surface angle detection device detecting the tilting angle of the mirror, the tilting device including a base member, a tilting member supporting the mirror on a front side of the base member so as to be tiltable around a predetermined tilting center, and a drive device exerting a driving force between the base member and the tilting member to tilt the tilting member, the mirror surface angle detection device including a sensor case, a mover and a position detection device, the sensor case being attached to a back side of the base member, the mover including a rear end portion, a front end portion and a shaft portion between the rear end portion and the front end portion, the rear end portion being housed in the sensor case, the shaft portion being inserted through a hole formed in the sensor case, the front end portion projecting to an outside of the sensor case, the mover being arranged so as to be movable relative to the sensor case in an axial direction of the shaft portion, the front end portion projecting to the outside of the sensor case penetrating a hole formed in the base member and engaging with the tilting member, the mover moving in the axial direction of the shaft portion, following tilting of the tilting member, the position detection device being housed in the sensor case and detecting a position in an axial direction of the mover relative to the sensor case, the vehicle mirror apparatus further comprising a seal structure sealing a gap between the shaft portion of the mover and the hole in the sensor case, the seal structure including a ring-shaped seal member interposed between the sensor case and the base member with the shaft portion of the mover, the shaft portion projecting from the sensor case, passed through a center hole of the seal member, and a screw member screw-fastening the sensor case and the base member together to interconnect the sensor case and the base member, and bringing the seal member into pressure contact and holding the seal member between the sensor case and the base member via a force of the screw fastening. According to the aspect of the present invention, the seal member is interposed between the sensor case and the base member, the sensor case and the base member are screw-fastened together via the screw member to interconnect the sensor case and the base member, and the seal member is brought into pressure contact, and is held, between the sensor case and the base member via a force of the screw fastening, and thus, the need for an O ring cover can be eliminated. Accordingly, the number of components can be reduced. Also, the need for the step of fixing an O ring cover to the sensor case is eliminated. Also, an entire thickness of a combination of the tilting device and the mirror surface angle detection device can be reduced.

In another aspect of the present invention, it is possible that the seal member having a flat shape including an outer peripheral-side part that is brought into pressure contact between the sensor case and the base member, and an inner peripheral-side part that is released from the pressure contact between the sensor case and the base member or is subject to pressure contact that is weaker than the pressure contact in the outer peripheral-side part. Accordingly, the mover can be moved in the axial direction thereof with the outer peripheral-side part of the seal member interposed, brought into pressure contact and held between the sensor case and the base member, while a periphery of the shaft portion of the mover is sealed by the inner peripheral-side part of the seal member.

In another aspect of the present invention, it is possible that the seal member includes a seal portion in the inner peripheral-side part, the seal portion having a circular shape in a cross-section taken along a plane extending through a center axis of the seal member, and an extension portion in the outer peripheral-side part, the extension portion having a plate-like shape, being thinner than the seal portion and extending outward from an outer peripheral edge portion of the seal portion. Accordingly, the seal portion of the seal member is thicker than the extension portion of the seal member, enabling the shaft portion of the mover to be sealed in a favorable manner.

In another aspect of the present invention, it is possible that the seal structure further includes an elongated protrusion at a position in either or both of the sensor case and the base member where the outer peripheral-side part of the seal member is arranged, the elongated protrusion being formed coaxially with the outer peripheral-side part, and upon the sensor case and the base member being screw-fastened together via the screw member, pushing the outer peripheral-side part of the seal member. Accordingly, as a result of the elongated protrusion being made to push the outer peripheral-side part of the seal member, the outer peripheral-side part can be firmly held between the sensor case and the base member. Also, intrusion of water into the sensor case through a gap between surfaces of the sensor case and the base member that face each other can be blocked.

In another aspect of the present invention, it is possible that: the seal member includes a seal portion in the inner peripheral-side part, the seal portion having a circular shape in a cross-section taken along a plane extending through a center axis of the seal member, and an extension portion in the outer peripheral-side part, the extension portion having a plate-like shape, being thinner than the seal portion and extending outward from an outer peripheral edge portion of the seal portion; the seal structure further includes an elongated protrusion at a position in either or both of the sensor case and the base member where the extension portion of the seal member is arranged, the elongated protrusion being formed coaxially with the extension portion, and upon the sensor case and the base member being screw-fastened together via the screw member, pushing the extension portion of the seal member; and the elongated protrusion pushes a position partway in a radial direction of the extension portion. Accordingly, the elongated protrusion pushes a position partway in the radial direction of the extension portion, and thus, motion of the seal portion is not excessively blocked compared to a case where the elongated protrusion pushes an innermost peripheral position in the radial direction of the extension portion, and smooth sliding of the mover relative to the seal member in the axial direction is not blocked.

In another aspect of the present invention, it is possible that: the seal structure further includes a wall on an outer peripheral side relative to a position in each of the sensor case and the base member where the seal member is arranged, the walls having mutually-different sizes, being formed coaxially with the position where the seal member is arranged, and being fitted together to mutually position the sensor case and the base member; and the seal member is arranged in a space on an inner peripheral side of a smaller one of the walls. Accordingly, as a result of the large and small walls being fitted together, the sensor case and the base member can be positioned without misalignment, and the seal member can be positioned in the space on the inner peripheral side of the smaller wall.

In another aspect of the present invention, it is possible that the screw member includes a plurality of screw members arranged at respective positions with the shaft portion interposed therebetween, the plurality of screw members screw-fastening the sensor case and the base member together in a direction parallel to the shaft portion to interconnect the sensor case and the base member. Accordingly, the screw member is arranged at positions with the shaft portion interposed therebetween, and the screw member is screw-fastened in the direction parallel to the shaft portion to interconnect the sensor case and the base member, enabling the seal member to be interposed between the sensor case and the base member without unevenness.

In another aspect of the present invention, it is possible that: the sensor case includes a case body, and a case cover that occludes an opening of the case body; and the screw member interconnects the case body, the case cover and the base member. Accordingly, the case body, the case cover and the base member can be interconnected via a common screw member. In another aspect of the present invention, it is possible that: the position detection device includes, for example, a resistor disposed on a substrate housed in the sensor case and a contact member disposed at the rear end portion (90c, 92c) of the mover, the contact member being in contact with the resistor; and the contact member slides along the resistor in association with movement in the axial direction of the mover.

BRIEF DESCRIPTION OF THE DRAWINGS

FIG. 5A is a side view and FIG. 5B is a bottom view;

FIG. 10A is a front view and FIG. 10B is a cross-sectional view along arrow B-B;

FIG. 13A is a side view and FIG. 13B is a back view.

DETAILED DESCRIPTION OF THE PREFERRED EMBODIMENTS

Figure 4:
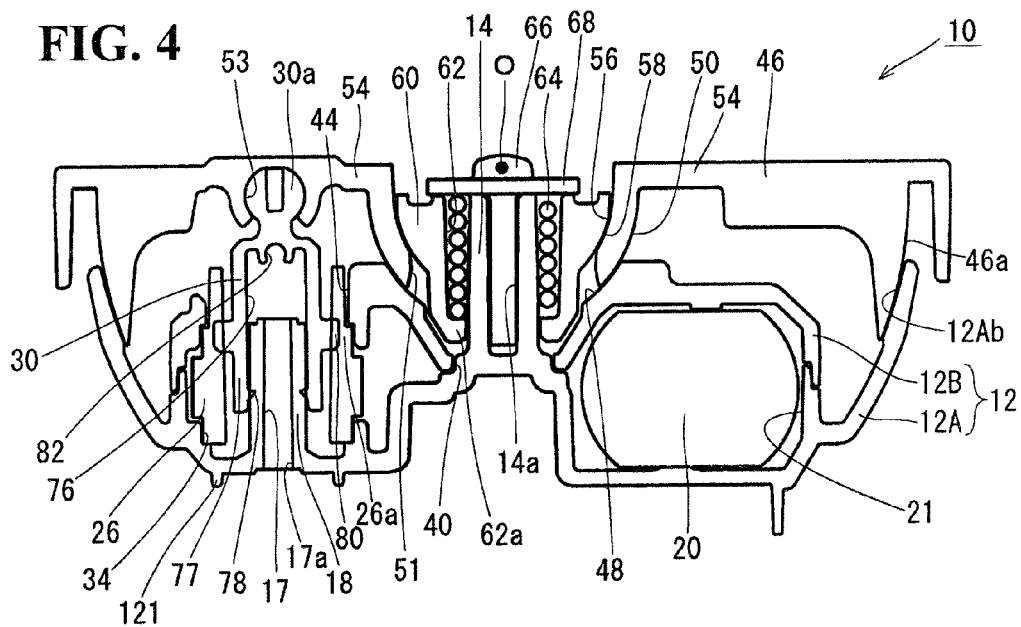
FIG. 4 is a diagram illustrating a state in which the tilting device 10 in FIG. 2 is assembled, which is a cross-sectional view along arrow A-A in FIG. 3.
Figure 5A:
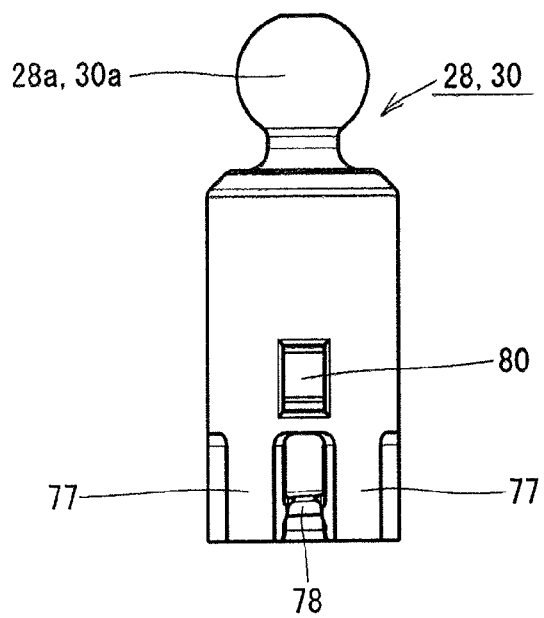
FIGS. 5A and 5B are enlarged views of an adjustment nut 28 or 30 in FIGS. 1 to 4.
Figure 5B:
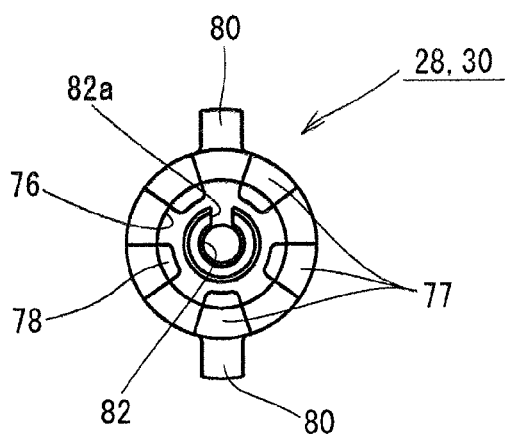

An embodiment of the present invention will be described. First, a tilting device 10 will be described with reference to FIGS. 1 to 5A and 5B. In the tilting device 10 in FIG. 2, each of a coil spring 64, a screw 66 and a retainer plate 68 can be formed using a metal, and components other than motors 20 and 22, the coil spring 64, the screw 66 and the retainer plate 68 can be formed using a plastic. As described later, an actuator housing 12 (base member) including a housing front 12A and a housing rear 12B in the tilting device 10 is fixed to a mirror housing (not illustrated). The housing front 12A has a bowl-like shape having a circular shape in the front. Inside the bowl of the housing front 12A, a boss 14 having a round rod shape is provided integrally with the housing front 12A so as to stand on a center axis of the bowl and two male thread members 16 and 18 are provided integrally with the housing front 12A so as to stand at off-center positions inside the bowl, respectively. The male thread member 18 is arranged at a position where the position of the male thread member 16 is rotated around the boss 14 by 90 degrees. A male thread is formed at an outer peripheral surface of each of the male thread members 16 and 18. On shaft axes of the male thread members 16 and 18, communication holes 17 and 17 (FIGS. 1 and 4) each having a circular shape in a cross-section perpendicular to the axis are formed. At a top of the boss 14, a screw hole 14a is formed.

Inside the bowl of the housing front 12A, two direct-current motors 20 (for horizontal tilting) and 22 (for vertical tilting), wheel worms 24 and 26 and adjustment nuts 28 and 30 (nut members) are housed. The motors 20 and 22 are housed and held in respective recesses 21 and 23. The adjustment nuts 28 and 30 coaxially and rotatably cover the respective free ends (upper ends) of the male thread members 16 and 18, and are threadably connected to the respective male threads at the outer peripheral surfaces of the male thread members 16 and 18, thereby the adjustment nuts 28 and 30 advance/retract along the respective male thread members 16 and 18 according to respective directions of rotation of the adjustment nuts 28 and 30. Respective lower portions of the wheel worms 24 and 26 are rotatably held in respective recesses 32 and 34 formed coaxially with the respective male thread members 16 and 18 inside the bowl of the housing front 12A. The wheel worms 24 and 26 engage with respective worm gear 36 and 38 attached to rotation shafts of the motors 20 and 22 and are thereby driven and rotated by the respective motors 20 and 22. The adjustment nuts 28 and 30 are connected to the respective wheel worms 24 and 26 in such a manner that the adjustment nuts 28 and 30 are non-rotatable relative to the respective wheel worms 24 and 26 and are movable relative to the respective wheel worms 24 and 26 in respective axial directions. Accordingly, upon the motor 20 or 22 being rotated, the corresponding adjustment nut 28 or 30 is rotated via the corresponding worm gear 36 or 38 and the corresponding wheel worm 24 or 26, whereby the adjustment nut 28 or 30 advances/retracts along the corresponding male thread member 16 or 18 according to a direction of the rotation.

The housing rear 12B is covered on and attached to a front surface of the housing front 12A. Consequently, the motors 20 and 22, the worm gears 36 and 38, the wheel worms 24 and 26 and the adjustment nuts 28 and 30 are housed in an internal space of the actuator housing 12 including the housing front 12A and the housing rear 12B. In this state, the boss 14 projects from an opening 40 at a center position of the housing rear 12B upward of the actuator housing 12. Upper portions of the wheel worms 24 and 26 and upper portions of the adjustment nuts 28 and 30 project from respective openings 42 and 44 formed at respective off-center positions of the housing rear 12B to the outside of the actuator housing 12.

On a front surface of the actuator housing 12, a plate pivot 46 (tilting member) is tiltably held. In other words, at a center portion of a front surface of the housing rear 12B, a recessed spherical portion 48 is formed, and at a central portion of a back surface of the plate pivot 46, a projecting spherical portion 50 (FIG. 4) is formed. Ball joint connection resulting from fitting the recessed spherical portion 48 and the projecting spherical portion 50 together holds the plate pivot 46 so that the plate pivot 46 is horizontally and vertically tiltable relative to the housing rear 12B. At a center position in the projecting spherical portion 50, an opening 51 is formed, and the boss 14 projects upward from the opening 51. At four sites in a circumferential direction of a wall surface included in the recessed spherical portion 48, cuts 52 are formed at equal intervals. In the plate pivot 46, connection portions 54 that connect a center portion (which is a part in which the projecting spherical portion 50 is formed) and respective peripheral edge portions at equal intervals at four sites in a circumferential direction are formed. The respective connection portions 54 are fitted in the respective cuts 52 so as be slidable in respective depth directions of the cuts 52. Consequently, the plate pivot 46 tilts in such a manner that rotation of the plate pivot 46 relative to the actuator housing 12 is blocked. At a lower surface of the plate pivot 46, recessed spherical portions 53 and 53 (FIG. 4) are formed at respective positions that face respective projecting spherical portions 28a and 30a at front ends of the adjustment nuts 28 and 30, and the projecting spherical portions 28a and 30a are fitted in the respective recessed spherical portions 53 and 53 and thus are connected to the recessed spherical portions 53 and 53 by means of ball joint connection.

At a back surface of the projecting spherical portion 50 of the plate pivot 46 (top surface of the plate pivot 46), a recessed spherical portion 56 is formed. In the recessed spherical portion 56, a cap support 60 having a projecting spherical portion 58 is housed. In the cap support 60, a circular hole 62 (FIG. 4) having a cylindrical shape is formed along a center axis thereof, and the boss 14 projects upward from the circular hole 62. A coil spring 64 is housed from above in a gap between an outer peripheral surface of the boss 14 and an inner peripheral surface of the circular hole 62. A lower end of the coil spring 64 is received and supported by an upper surface of a small-diameter portion 62a (FIG. 4) at a lower end of the circular hole 62 of the cap support 60.

The tilting device 10 is assembled, for example, as follows. The motors 20 and 22 with the worm gears 36 and 38 attached thereto are put in the respective recesses 21 and 23 of the housing front 12A. The adjustment nuts 28 and 30 are screwed onto the respective male thread members 16 and 18. The wheel worms 24 and 26 are coaxially put on the respective adjustment nuts 28 and 30, and lower portions of the wheel worms 24 and 26 are rotatably held in the respective recesses 32 and 34. Here, the wheel worms 24 and 26 engage with the respective worm gears 36 and 38. The housing rear 12B is covered on the housing front 12A. The plate pivot 46 is mounted on the housing rear 12B. The cap support 60 is put in the recessed spherical portion 56 of the plate pivot 46. The coil spring 64 is put in the gap between the outer peripheral surface of the boss 14 and the inner peripheral surface of the circular hole 62. In this state, the screw 66 is screwed from above and fixed in the screw hole 14a at the top of the boss 14, whereby the tilting device 10 is assembled as a single-piece article. The retainer plate 68 is held on the screw 66 and the screw 66 is screwed into the boss 14, whereby the retainer plate 68 compresses the coil spring 64. By an elastic force of the coil spring 64 due to the compression, the cap support 60 presses the plate pivot 46 downward, generating adequate frictional forces between the recessed spherical portion 48 and the projecting spherical portion 50 and between the recessed spherical portion 56 and the projecting spherical portion 58. The frictional forces allow the plate pivot 46 to be held at arbitrary tilting angles in horizontal and vertical directions relative to the actuator housing 12.

A tilting center O (FIG. 4) of the plate pivot 46 is formed at a spherical center of the recessed spherical portions 48 and 56 and the projecting spherical portions 50 and 58. An outer peripheral surface 46a of a lower portion of the plate pivot 46 is formed in a projecting spherical shape with the tilting center O as a center. An inner peripheral surface 12Ab of a peripheral edge portion of the housing front 12A is formed in a recessed spherical shape with the tilting center O as a center. When tilting the plate pivot 46, the outer peripheral surface 46a of the lower part of the plate pivot 46 and the inner peripheral surface 12Ab of the peripheral edge portion of the housing front 12A slide relative to each other. The tilting device 10 is fixed inside the mirror housing (not illustrated) via three screws (not illustrated). In other words, the three screws are inserted into three properly designated positions from among openings 45 (FIG. 2) at four positions at a front surface of the plate pivot 46 from the front surface side of the tilting device 10, and screwed into bosses (bosses directly formed at the mirror housing or bosses formed at frames to which the mirror housing is fixed) inside the mirror housing of the outer mirror (e.g., a door mirror or a fender mirror) through screw passage holes 47 (FIG. 2) of the housing rear 12B and screw passage holes 49 (FIG. 3) of the housing front 12A. Consequently, the housing rear 12B is connected to the bosses by means of screw fastening with the housing front 12A therebetween. In such a manner described above, the tilting device 10 is fixed inside the mirror housing. In other words, heads of the three screws are locked by the housing rear 12B, and the housing rear 12B and the housing front 12A are integrated by fastening of the three screws and fixed to the bosses inside the mirror housing. In the tilting device 10, a mirror subassembly 74 including a mirror 72 held by a mirror holder 70 is attached to the front surface of the plate pivot 46.

FIG. 5 illustrates the adjustment nut 28 or 30 in an enlarged manner. At the front end of the adjustment nut 28 or 30, the projecting spherical portion 28a or 30a to be connected to the recessed spherical portion 53 or 53 (FIG. 4) of the plate pivot 46 by means of ball joint connection is formed. Inside the adjustment nut 28 or 30, an empty space 76 or 76 for housing the male thread member 16 or 18 is formed. The empty space 76 or 76 opens at the rear end of the adjustment nut 28 or 30. The rear end of the adjustment nut 28 or 30 is divided into five legs 77 arranged at equal intervals in a circumferential direction. On the inner peripheral side of each leg 77, a lug 78 that is threadably connected to the male thread of the male thread member 16 or 18 is formed. On a side surface of the adjustment nut 28 or 30, projections 80 are formed. The projections 80 engage with grooves and cuts 24a or 26a (FIG. 2) formed in the wheel worm 24 or 26 in an axial direction thereof and connect the adjustment nut 28 or 30 to the wheel worm 24 or 26 in such a manner that the adjustment nut 28 or 30 is non-rotatable relative to the wheel worm 24 or 26 around the axis and is movable relative to the wheel worm 24 or 26 in the axial direction. At a far end surface at the bottom of the empty space 76 (position in the back of the projecting spherical portion 28a or 30a), a recessed spherical portion 82 or 82 is formed. A projecting spherical portion 90b or 92b at an extremity of the later-described slide block 90 or 92 (FIG. 7) is fitted in the recessed spherical portion 82 or 82, forming ball joint connection. In order to facilitate fitting of the projecting spherical portion 90b or 92b into the recessed spherical portion 82 or 82, a crack (cut) 82a is formed in a part of a peripheral wall surface of the recessed spherical portion 82 or 82.

Figure 1:
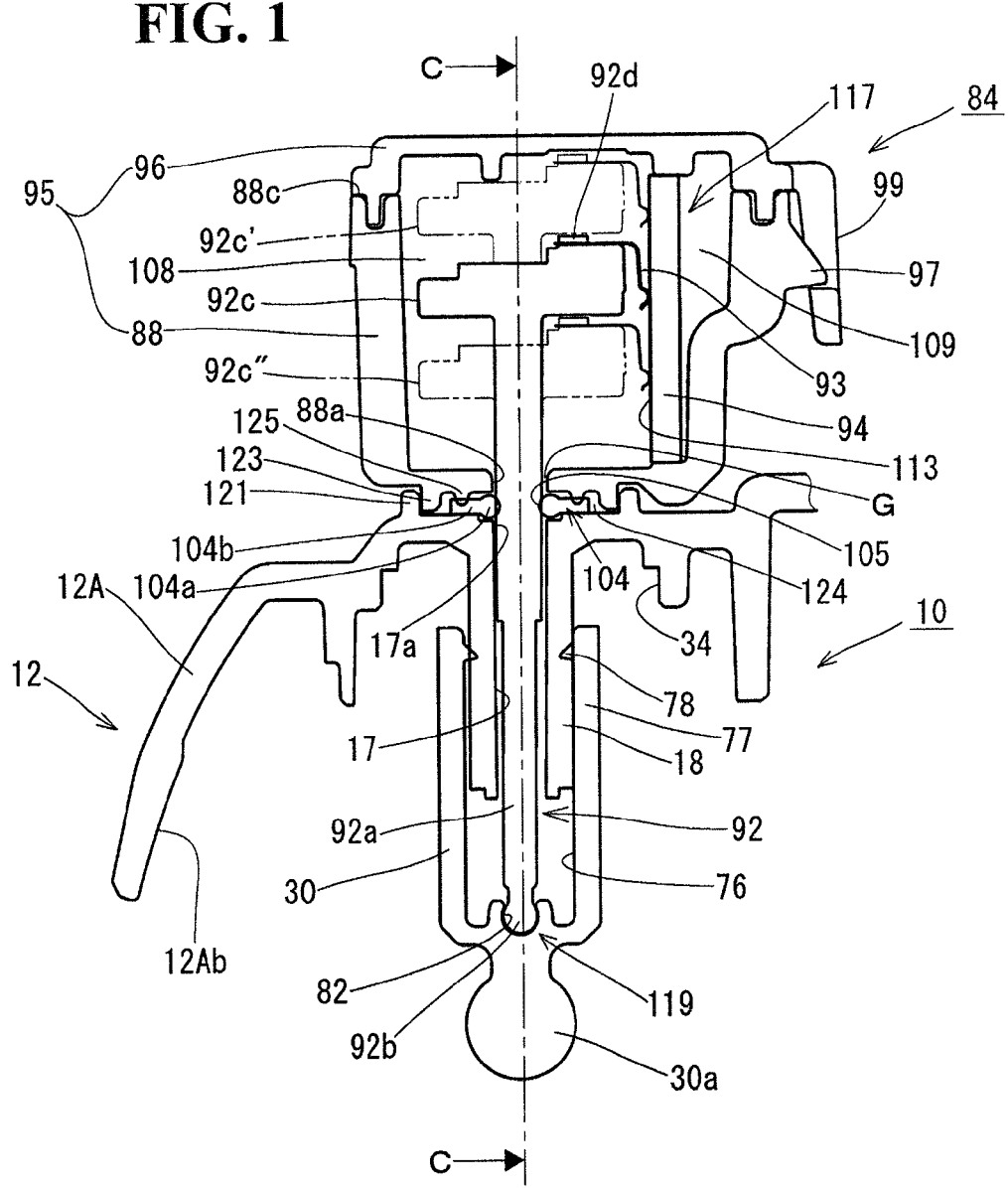
FIG. 1 is a partial cross-sectional diagram illustrating a state in which the mirror surface angle detection device 84 in FIG. 6 is attached to a tilting device 10 in the vehicle mirror apparatus in FIG. 2 (in FIG. 1, illustration of, e.g., drive devices for the tilting device 10 omitted), which is a cross-sectional view taken along a plane that extends through center axes of an adjustment nut 30 and a slide block 92 and is perpendicular to a print wiring board 94.
Figure 2:
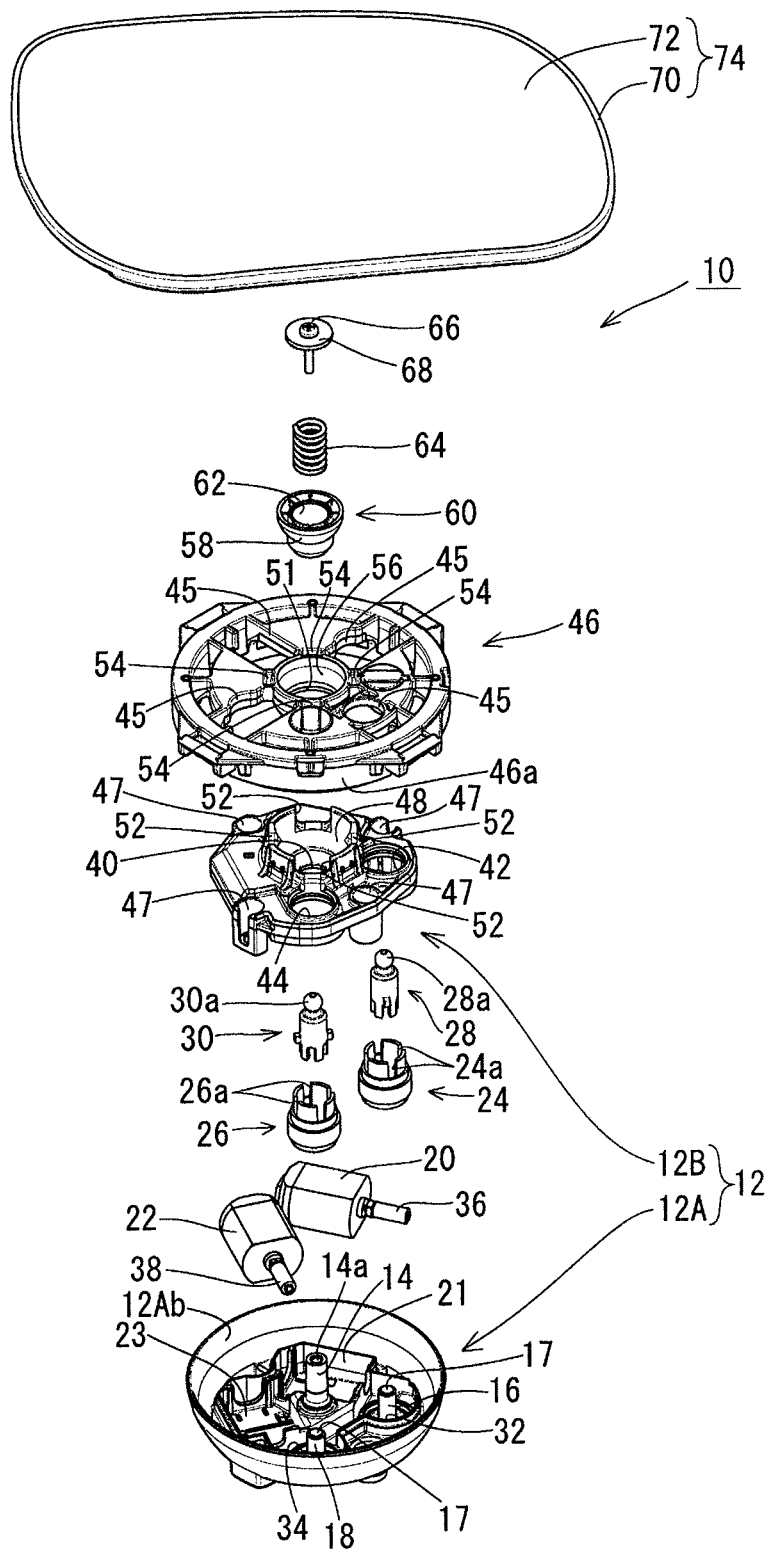
FIG. 2 is an exploded perspective view of the tilting device 10 for a vehicle mirror apparatus, which is an embodiment of the present invention.
Figure 3:
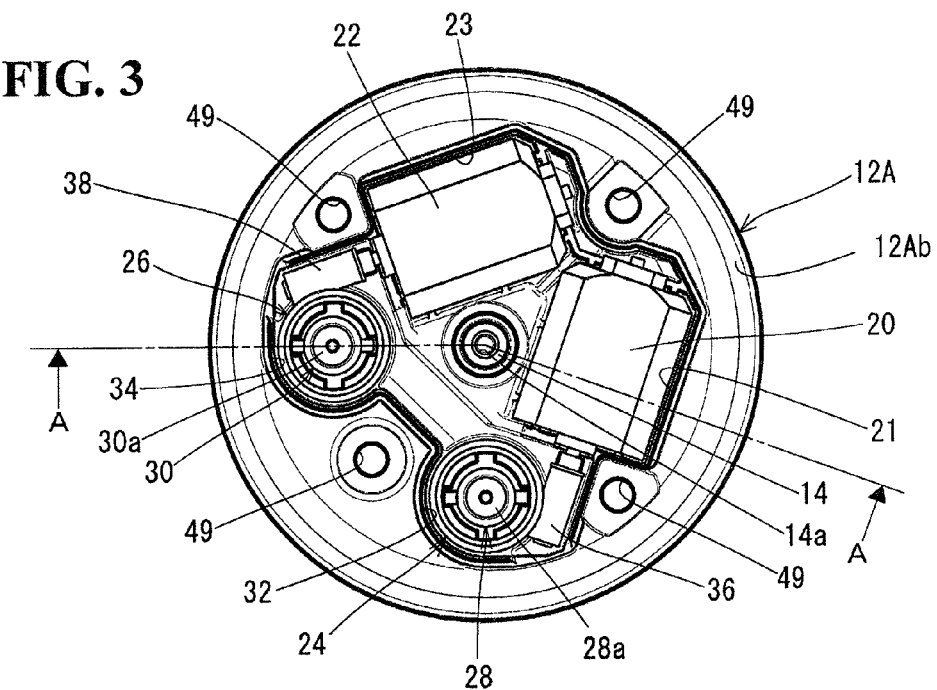
FIG. 3 is a front view illustrating a state in which drive devices are housed in a housing front 12A of the tilting device 10 in FIG. 2.
Figure 6:
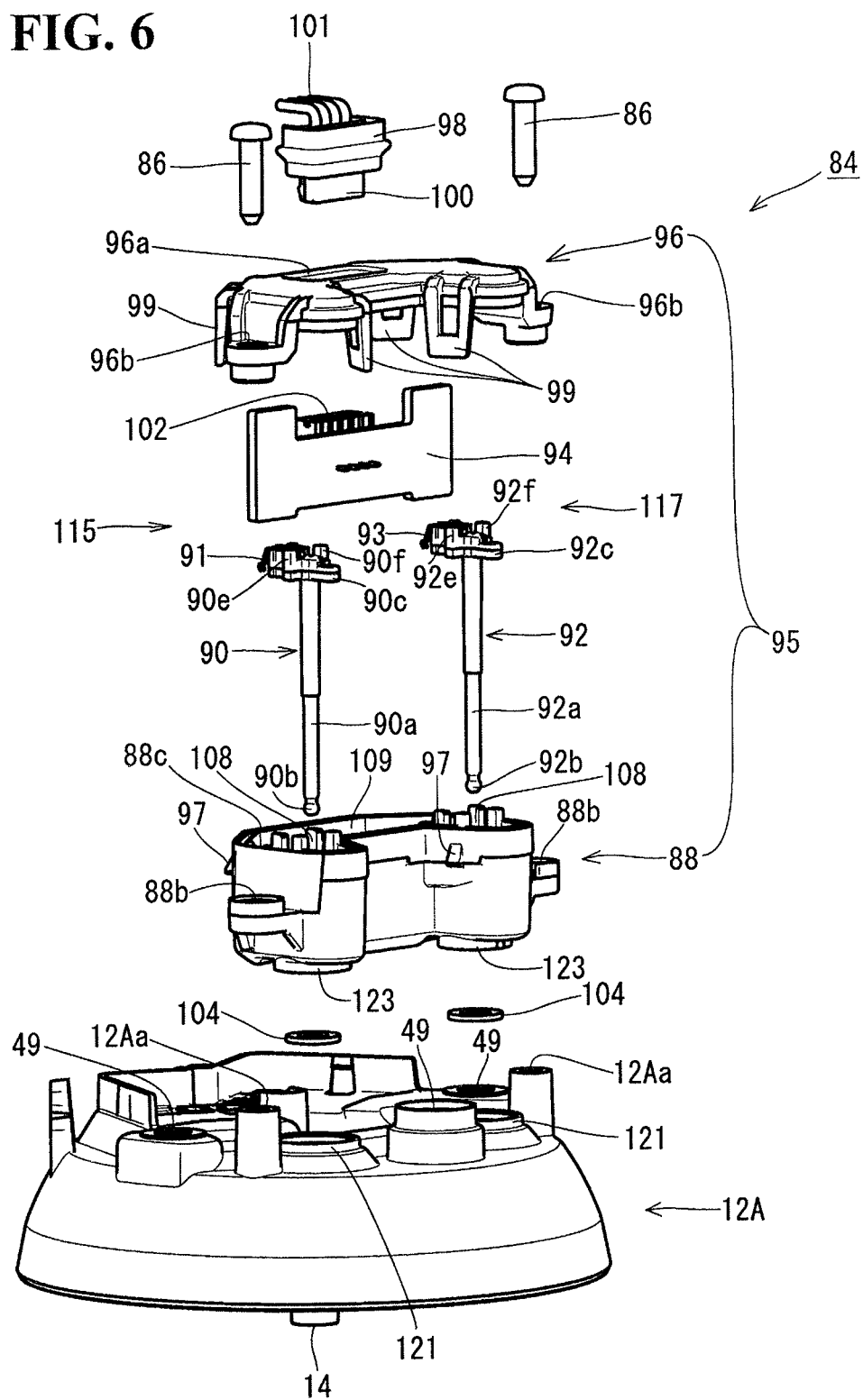
FIG. 6 is an exploded perspective view of a mirror surface angle detection device 84 attached to the tilting device 10 in FIG. 2.

Next, the mirror surface angle detection device 84 will be described with reference to FIGS. 1 and 6 to 11. Here, FIGS. 1 and 11 illustrate the slide block 92 side only, but a configuration that is the same as that of the slide block 92 side is provided on the slide block 90 side. In the mirror surface angle detection device 84 in FIG. 6, each of screws 86 and 86 and slide contacts 91 and 93 can be formed by a metal, and components other than the screws 86 and 86, the slide contacts 91 and 93, a rubber seal 98 and a print wiring board 94 and rubber O rings 104 and 104 can be formed by a plastic. In FIG. 6, in empty spaces 108 and 108 horizontally arranged inside the case body 88, rod-like slide blocks 90 and 92 (movers) with the respective slide contacts 91 and 93 attached thereto are housed so as to be movable in respective axial directions. In an empty space 109 connecting the empty spaces 108 and 108, the print wiring board 94 is immovably housed so as to face the slide contacts 91 and 93. The mirror surface angle detection device 84 is configured by putting the slide blocks 90 and 92 into the empty spaces 108 and 108, putting the print wiring board 94 into the empty space 109 and occluding an opening 88c at an upper end of the case body 88 by means of the case cover 96. The case body 88 and the case cover 96 provide the sensor case 95. The case body 88 and the case cover 96 are interconnected (temporarily joined) by means of engagement between lugs 97 formed so as to project at four positions in an outer peripheral surface of the case body 88 and U-shaped portions 99 formed at respective positions corresponding to the lugs 97 in the case cover 96. A connector 100 with the rubber seals 98 attached thereto is inserted into a hole 96a formed at a center portion of the case cover 96. The connector 100 is connected to a connector 102 of the print wiring board 94. Detection wirings 101 are drawn out from the connector 100. After the mirror surface angle detection device 84 is assembled to the tilting device 10, the connector 100 can be attached/detached to/from the connector 102 from the outside of the sensor case 95. Shaft portions 90a and 92a of the slide blocks 90 and 92 project outward of the sensor case 95 through circular holes 88a and 88a (FIG. 1) in a lower surface of the case body 88, so as to be movable in the axial direction. After the mirror surface angle detection device 84 is assembled, the shaft portions 90a and 92a of the slide blocks 90 and 92, which project outward of the sensor case 95, are passed through the respective O rings 104 and 104, and then inserted into respective openings 17a and 17a provided in a back surface of the housing front 12A in the FIG. 1 (openings of the communication holes 17 and 17 in the male thread members 16 and 18), and then the lower surface of the case body 88 is mounted on the back surface of the housing front 12A, and the screws 86 and 86 are passed through screw passage holes 96b and 96b (FIG. 6) of the case cover 96 and screw passage holes 88b and 88b of the case body 88 and then screwed into screw holes 12Aa and 12Aa of the housing front 12A. Consequently, the mirror surface angle detection device 84 is fixed and attached to the back surface of the housing front 12A. Here, heads of the screws 86 and 86 are locked by the case cover 96 and thus the case body 88 and the case cover 96, which are temporarily joined by means of engagement between the lugs 97 and the U-shaped portions 99 are finally joined by means of fastening of the screws 86 and 86.

Figure 7:
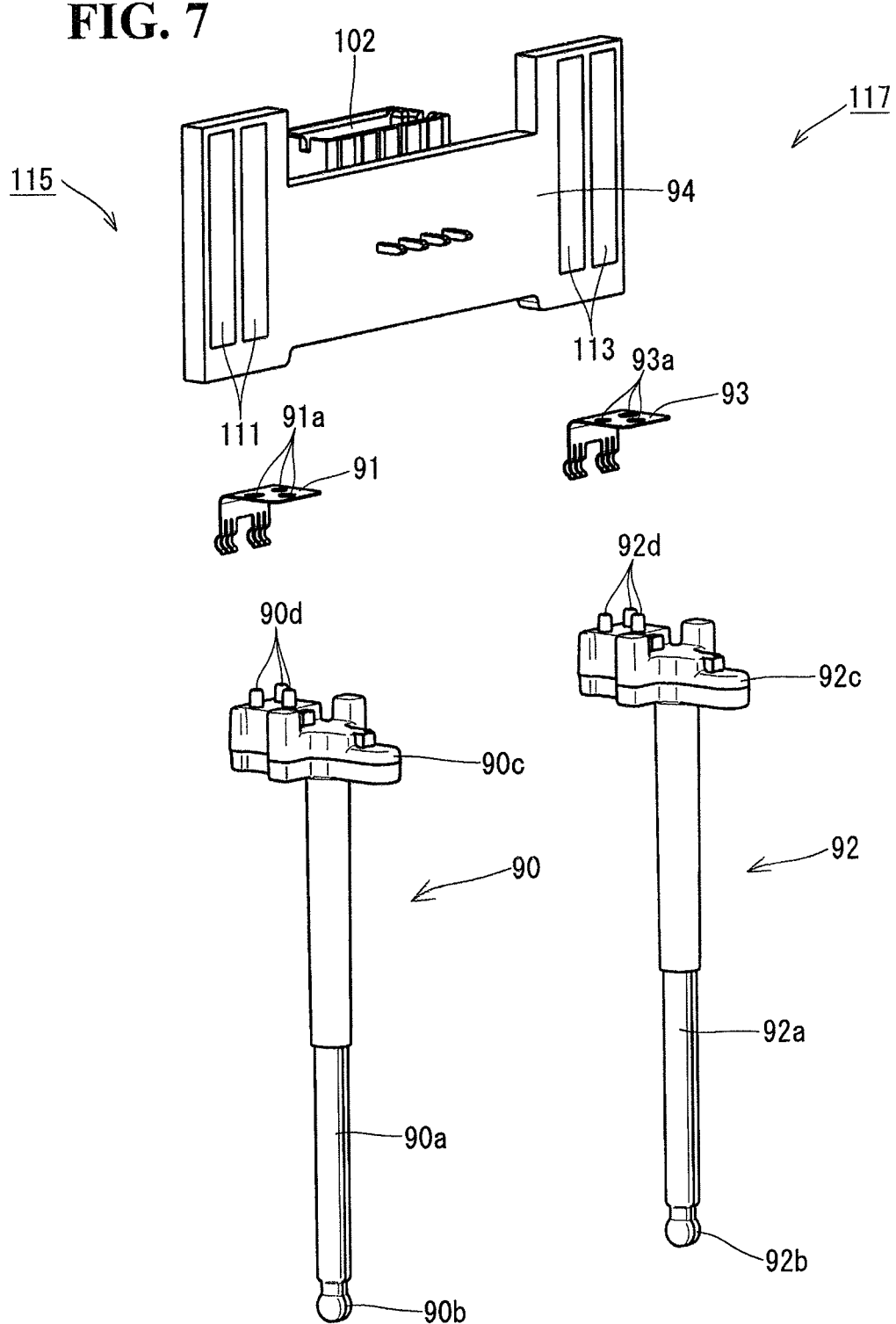
FIG. 7 is an enlarged exploded perspective view of the position detection devices 115 and 117 in FIG. 6.

FIG. 7 is an enlarged view of position detection devices 115 and 117 including the slide blocks 90 and 92, the slide contacts 91 and 93, and the print wiring board 94. Each of the slide blocks 90 and 92 is formed by, for example, a single-piece molding of a fiber-reinforced plastic. The slide blocks 90 and 92 include the shaft portions 90a and 92a, the projecting spherical portions 90b and 92b formed at extremity portions of the shaft portions 90a and 92a, and bulge portions 90c and 92c formed at the rear ends of the shaft portions 90a and 92a, respectively. The shaft portions 90a and 92a are formed so as to have a circular shape in a cross-section perpendicular to respective axes, and inserted through the communication holes 17 and 17 of the male thread members 16 and 18 so as to be movable in the axial direction, respectively. The projecting spherical portions 90b and 92b are formed so as to have a diameter that allows the projecting spherical portions 90b and 92b to pass through the communication holes 17 and 17 and are passed through the communication holes 17 and 17 and exit from extremity portions of the communication holes 17 and 17 (FIG. 1). The bulge portions 90c and 92c are formed so as to have a non-circular shape in a cross-section perpendicular to the axes of the slide blocks 90 and 92. On end surfaces of the bulge portions 90c and 92c, projections 90d and 92d are formed, respectively. Holes 91a and 93a that correspond to the projections 90d and 92d are formed in the slide contacts 91 and 93, respectively. The slide contacts 91 and 93 are fixed and attached to the bulge portions 90c and 92c by inserting the projections 90d and 92d into the holes 91a and 93a and crushing the projections 90d and 92d by means of thermal caulking, respectively. The bulge portions 90c and 92c are housed in the respective empty spaces 108 and 108 (FIGS. 1, 6 and 8) formed inside the case body 88 so as to be movable in the respective axial directions and be non-rotatable around the respective axes. On the print wiring board 94, resistors 111 and 113 are printed along respective directions of movement of the slide blocks 90 and 92. The slide contacts 91 and 93 are in contact with the resistors 111 and 113, and slide along the resistors 111 and 113 in association with movement of the slide blocks 90 and 92, respectively (FIG. 1). The combination of the slide contact 91 and the resistor 111 and the combination of the slide contact 93 and the resistor 113 form the position detection devices 115 and 117, respectively. In other words, positions in the slide contacts 91 and 93 that are in contact with the resistors 111 and 113 are detected as voltage values by detection circuits (not illustrated) through the connectors 102 and 100 and the detection wirings 101, enabling positions in the axial directions of the slide blocks 90 and 92 to be detected as values corresponding to respective mirror surface angles.

Figure 8:
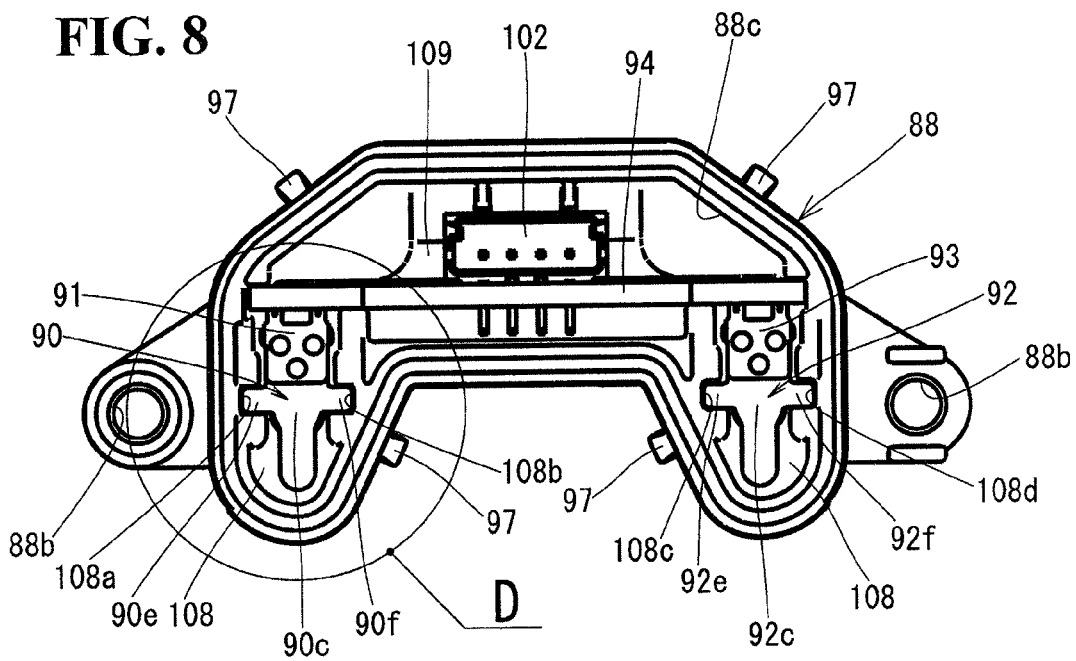
FIG. 8 is a diagram illustrating a state in which the mirror surface angle detection device 84 in FIG. 6 is assembled (which is, however, a state before a case cover 96 is attached), which is a diagram of an opening 88c at an upper end of a case body 88 as viewed from the front.
Figure 9:
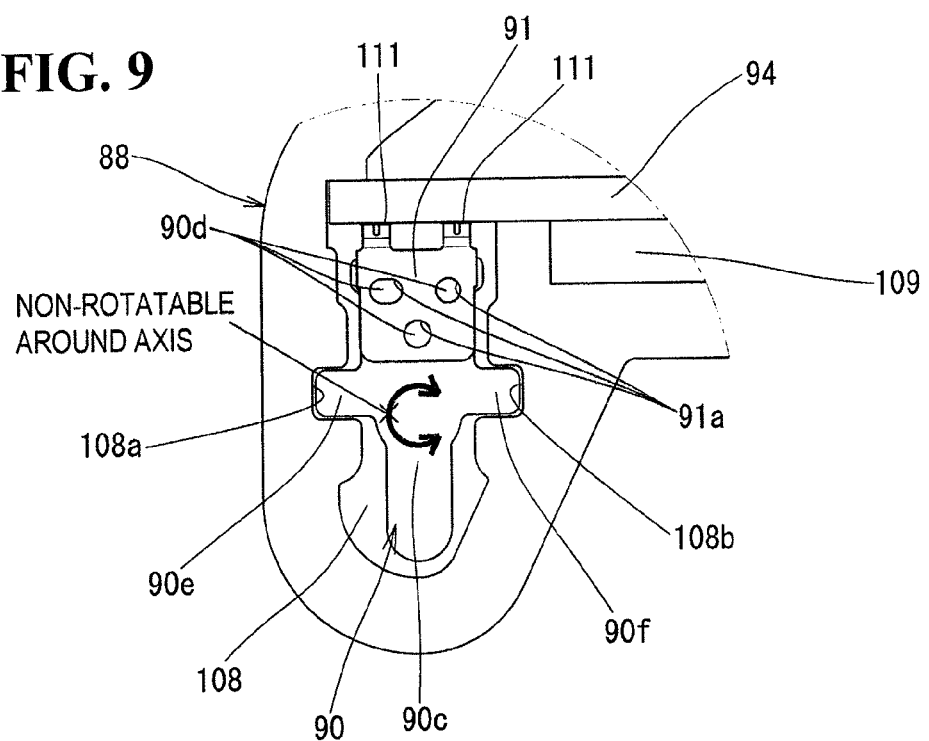
FIG. 9 is an enlarged view of the part D in FIG. 8.

A structure in which the bulge portions 90c and 92c are housed in the empty spaces 108 and 108 so as to be movable in the respective axial directions and be non-rotatable around the respective axes will be described with reference to FIG. 9, which is an enlarged view of part D in FIG. 8. At the bulge portion 90c, projections 90e and 90f that project in the left/right direction and extend in the axial direction of the slide block 90 are formed. Guide grooves 108a and 108b that correspond to the projections 90e and 90f are formed at an inner wall surface of the empty space 108. The guide grooves 108a and 108b house the projections 90e and 90f and guide the projections 90e and 90f in such a manner that the projections 90e and 90f are slidable in the axial direction of the slide block 90. As a result of fitting between the projections 90e and 90f and the guide grooves 108a and 108b, the slide block 90 is housed in the empty space 108 so as to be movable in the axial direction thereof and is non-rotatable around the axis. As a result, the slide contact 91 slides on the resistor 111 in association with movement in the axial direction of the slide block 90. Although FIG. 9 illustrates the bulge portion 90c side, a structure of fitting between projections 92e and 92f and guide grooves 108c and 108d (FIG. 8) is provided on the bulge portion 92c side as well as on the bulge portion 90c side.

Figure 10A:
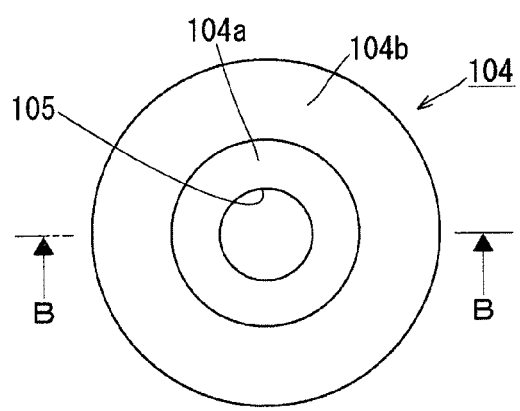
FIGS. 10A and 10B are enlarged views of the O ring 104 in FIGS. 1 and 6.
Figure 10B:
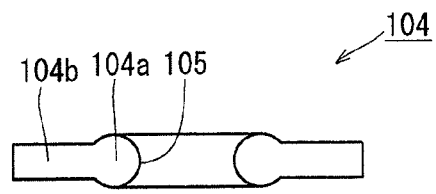
Figure 11:
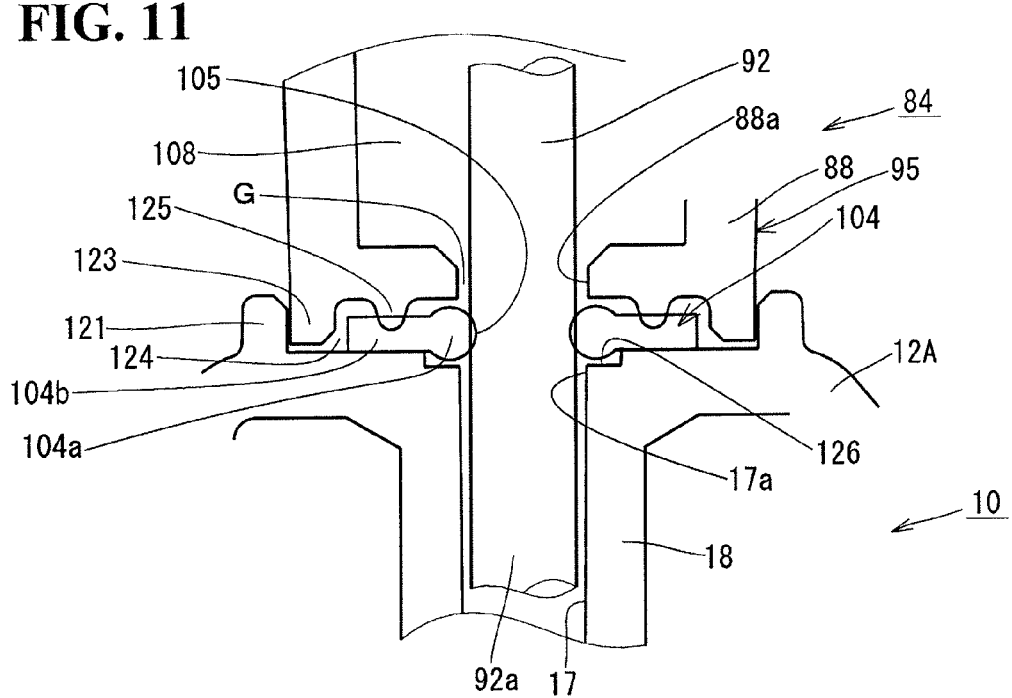
FIG. 11 is a partial enlarged cross-sectional view along arrow C-C in FIG. 1.
Figure 12:
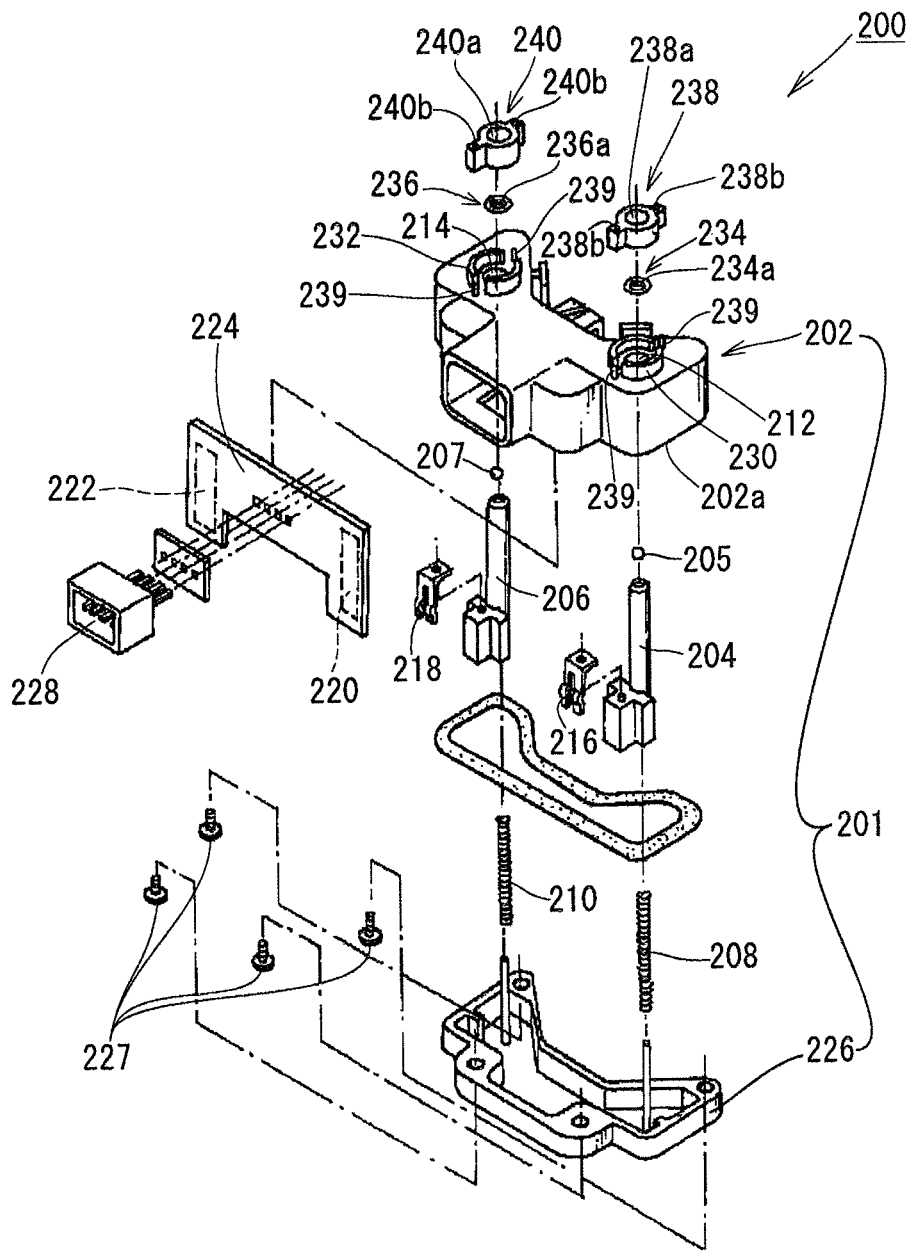
FIG. 12 is a diagram illustrating a conventional mirror surface angle detection device 200, which illustrates the structure described in Japanese Patent Laid-Open No. 2001-294091.
Figure 13A:
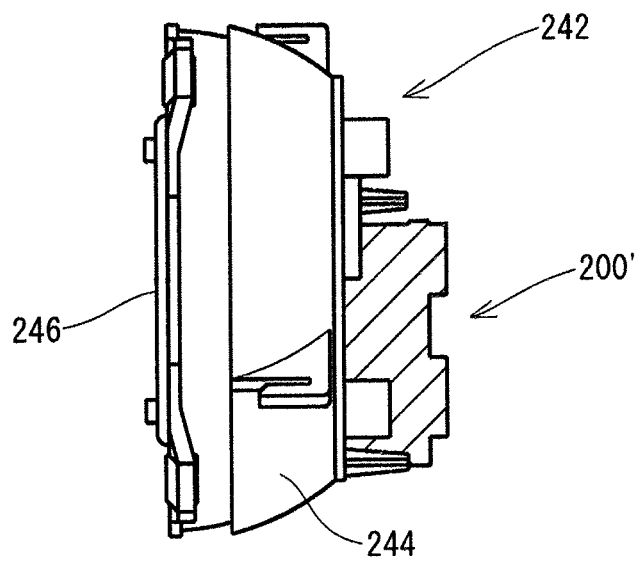
FIGS. 13A and 13B are diagrams each illustrating a tilting device 242 for a vehicle mirror apparatus equipped with a mirror surface angle detection device 200' having a structure similar to that in FIG. 12, which has been put into practical use.
Figure 13B:
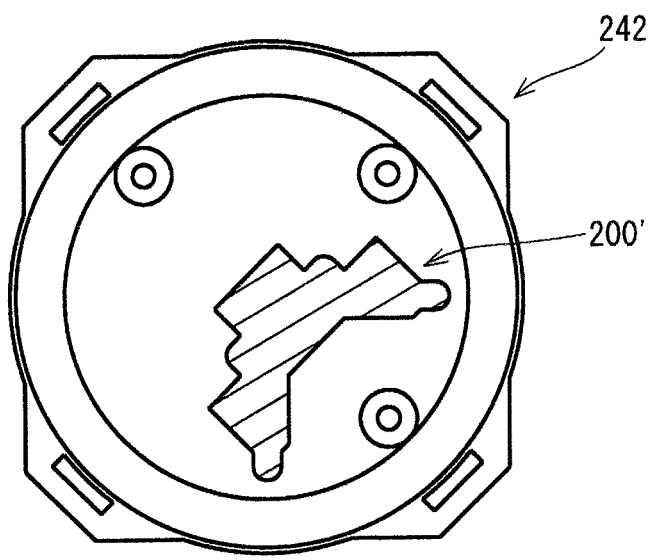
Figure 14:
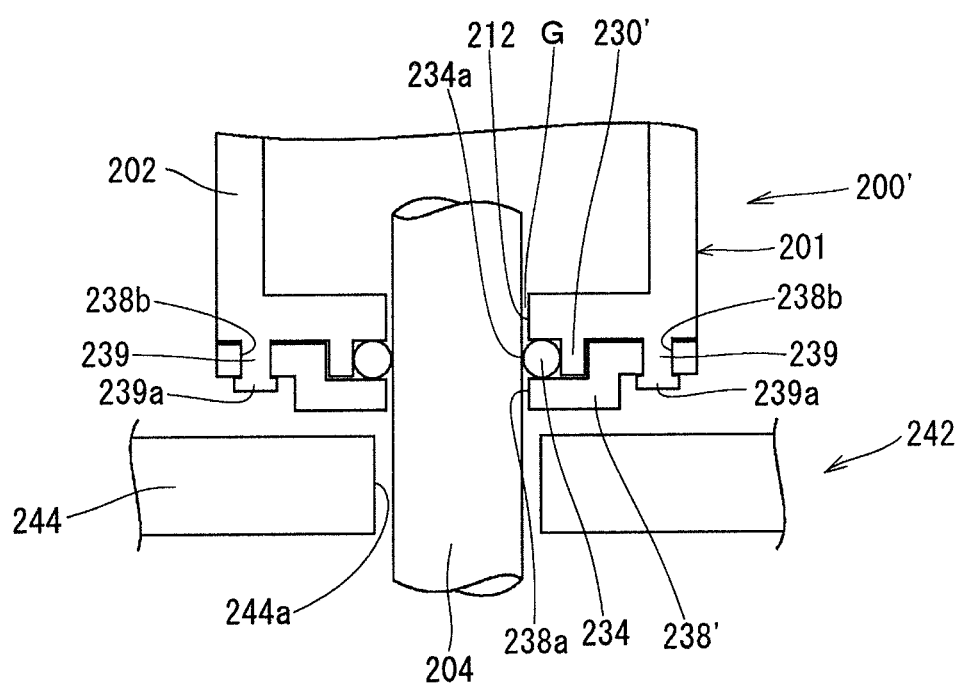
FIG. 14 is a partial enlarged cross-sectional view taken along a plane along an axis of a mover 204, which illustrates a seal structure in the mirror surface angle detection device 200' in FIG. 13.

FIGS. 10A and 10B illustrate a structure of the O ring 104. Each of the O rings 104 is a single-piece molding of an elastic body such as rubber, and is formed so as to have a flat disc shape in its entirety, and includes a circular center hole 105 formed at a center portion thereof, the circular center hole 105 allowing the corresponding shaft portion 90a or 92a of the slide block 90 or 92 to pass therethrough in such a manner that the shaft portion 90a or 92a is slidable in the axial direction. At a position facing the center hole 105, a seal portion 104a having a circular shape in a cross-section along a plane that extends through a center axis as illustrated in FIG. 10B is formed. While the seal portion 104a seals the corresponding shaft portion 90a or 92a of the slide block 90 or 92 passed through the center hole 105 in a watertight manner, the seal portion 104a allows the shaft portion 90a or 92a to move (slide) in the axial direction. At an outer peripheral edge portion of the seal portion 104a, an extension portion 104b that extends outward from the seal portion 104a is formed so as to be continuous with the seal portion 104a. As illustrated in FIG. 10B, the extension portion 104b is formed so as to have a plate-like shape having a fixed thickness smaller than that of the seal portion 104a. The extension portion 104b is held between the housing front 12A and the case body 88. The extension portion 104b serves to suppress movement of the seal portion 104a in the axial direction of the slide block 90 or 92 together with the slide block 90 or 92 in association with movement of the slide block 90 or 92 in the axial direction and serves to seal a space between the housing front 12A and the case body 88 in a watertight manner.

FIG. 1 illustrates a state in which the mirror surface angle detection device 84 is attached to the tilting device 10. At the back surface of the housing front 12A, walls 121 and 121 each having a continuous circular shape are formed so as to project coaxially with the respective communication holes 17 and 17. Also, at a back surface of the case body 88, walls 123 and 123 each having a continuous circular shape are formed so as to project coaxially with the respective circular holes 88a and 88a. The walls 121 and 121 have a diameter larger than that of the walls 123 and 123, and the walls 123 and 123 have an outer diameter (diameter of an outer peripheral surface) substantially equal to an inner diameter of the walls 121 and 121 (diameter of an inner peripheral surface). The mirror surface angle detection device 84 is positioned on the tilting device 10 by fitting the walls 123 and 123 in the inner peripheral sides of the respective walls 121 and 121, and is attached to the tilting device 10 via the screws 86 in such positioned state. The O rings 104 and 104 are housed in respective spaces 124 and 124 on the inner peripheral sides of the walls 123 and 123, and are arranged in such a manner that the O rings 104 and 104 are directly sandwiched by surfaces of the housing front 12A and the case body 88 that face each other and are in pressure contact with (crushed between) the surfaces.

FIG. 11 is an enlarged view of a part in which the O ring 104 is arranged, along arrow C-C in FIG. 1. In the back surface of the case body 88, elongated protrusions 125 having a continuous circular shape are formed coaxially with the respective circular holes 88a and the respective walls 123 between the circular holes 88a and the walls 123. When the mirror surface angle detection device 84 is attached to the tilting device 10 via the screws 86 and 86 (FIG. 6), the entire circumferences of the elongated protrusions 125 push a position partway in a radial direction of the respective extension portions 104b of the O rings 104 by means of fastening forces of the screws 86 and 86. The screws 86 and 86 are arranged on the opposite sides across the slide blocks 90 and 92, and interconnect the housing front 12A and the sensor case 95 by fastening of the screws 86 and 86 in a direction parallel to the shaft portions 90a and 92a of the slide block 90 and 92, enabling the elongated protrusions 125 to push the respective extension portions 104b without unevenness. As a result of the pushing, the surfaces of the case body 88 and the housing front 12A that face each other are sealed in a watertight manner, intrusion of water from the outside into the sensor case 95, i.e., from the outside of the facing surfaces into the sensor case 95 through a gap between the facing surfaces and a gap G between the shaft portion 92a of the mover 92 and a peripheral wall surface of the circular hole 88a of the case body 88, is blocked. Also, movement of the seal portion 104a together with the slide block 92 in the axial direction of the slide block 92 along with movement in the axial direction of the slide block 92 is suppressed. As a result of movement of the seal portion 104a being suppressed, the sealing of the shaft portion 92a by the seal portion 104a is maintained in a favorable manner, and intrusion of water from the outside into the sensor case 95 through the communication hole 17 and the gap G is also blocked. In the back surface of the housing front 12A, at an innermost peripheral position of a part in which the seal portion 104a is arranged (position facing the communication hole 17), a circular recess 126 cut concentrically with the communication hole 17 is formed. The recess 126 receives the seal portion 104a. The recess 126 provides a pressure contact releasing section that serves to release the seal portion 104a from the pressure contact by the housing front 12A and the case body 88 or weaken the pressure contact to be smaller than that in the extension portion 104b. The pressure-contact releasing section 126 suppresses crushing of the seal portion 104a, preventing an increase in frictional force between the shaft portion 92a of the slide block 92 and an inner peripheral surface of the center hole 105. Consequently, the slide block 92 can smoothly move (slide) in the axial direction. Also, the elongated protrusion 125 pushes not an innermost peripheral position but a position partway in the radial direction of the extension portion 104b of the O ring 104 (that is, the O ring 104 is fixed at a position away from the seal portion 104a), and thus, the elongated protrusion 125 does not excessively block movement of the seal portion 104a, and thus, smooth sliding of the mover 92 relative to the O ring 104 in the axial direction is not hindered.

In FIG. 1, connection between the recessed spherical portion 82 or 82 in the adjustment nut 28 or 30 and the projecting spherical portion 90b or 92b in the slide block 90 or 92 is provided by, for example, attaching the mirror surface angle detection device 84 to the tilting device 10 and then driving the motor 20 or 22 to screw the adjustment nut 28 or 30 onto the male thread member 16 or 18 at a deepest position. In other words, when the adjustment nut 28 or 30 is screwed onto the male thread member 16 or 18 to the deepest position from a state in which the recessed spherical portion 82 or 82 and the projecting spherical portion 90b or 92b are unconnected, the end surface of the bulge portion 90c or 92c of the slide block 90 or 92 abuts against an inner surface of the case cover 96 and is locked by the inner surface (position indicated by reference numeral 92c' in FIG. 1), the projecting spherical portion 90b or 92b is pressed into and thereby fitted in the recessed spherical portion 82 or 82, whereby the slide block 90 or 92 is connected to the adjustment nut 28 or 30. Alternatively, when the adjustment nut 28 or 30 is firmly pressed into the male thread member 16 or 18 by hands, the lugs 78 and the thread groove at the outer peripheral surface of the male thread member 18 are disengaged by deflection of the legs 77, and the adjustment nut 28 or 30 is pressed onto the male thread member 16 or 18 until the end surface of the bulge portion 90c or 92c of the slide block 90 or 92 abuts against the inner surface of the case cover 96, and thus, the slide block 90 or 92 can also be connected to the adjustment nut 28 or 30 by such method. Once the slide block 90 or 92 is connected to the adjustment nut 28 or 30, the slide block 90 or 92 moves following the adjustment nut 28 or 30 in the axial direction.

As illustrated in FIG. 1, upon the adjustment nut 30 being rotated by driving the motor 22 in a state in which the slide block 92 is connected to the adjustment nut 30, engagement between the lugs 78 of the adjustment nut 30 and the thread groove at the outer peripheral surface of the male thread member 18 makes the adjustment nut 30 move in the axial direction along the male thread member 18 and the plate pivot 46 connected to the projecting spherical portion 30a by means of ball joint connection vertically tilts with the tilting center O (FIG. 4) as a center, whereby a mirror surface angle in the vertical direction of the mirror 72 is adjusted. Here, the slide block 92 whose projecting spherical portion 92b is connected to the recessed spherical portion 82 in the adjustment nut 30 by means of ball joint connection moves in the axial direction following the adjustment nut 30 while rotating around the axis relative to the adjustment nut 30 via a ball joint 119 in such a manner that rotation around the axis relative to the sensor case 95 is blocked by the engagement between the projections 92e and 92f of the bulge portion 92c and the guide grooves 108c and 108d at the wall surface of the empty space 108. The slide block 92 moves in a range in which the bulge portion 92c moves to positions indicated by reference numerals 92c' (deepest position) and 92c" (shallowest position) in FIG. 1 (position indicated by reference numeral 92c is an intermediate position). A position in the axial direction of the slide block 92 relative to the actuator housing 12 is detected as a voltage value according to a contact position in the resistor 113 that is in contact with the slide contact 93, and a mirror surface angle in the vertical direction of the mirror 72 is detected according to the voltage value.

Adjustment and detection of a mirror surface angle in the horizontal direction of the mirror 72 are performed in a manner similar to the above. In other words, upon the adjustment nut 28 being rotated by driving the motor 20, the adjustment nut 28 moves in the axial direction along the male thread member 16, and the plate pivot 46 connected to the projecting spherical portion 28a by means of ball joint connection horizontally tilts with the tilting center O (FIG. 4) as a center, whereby a mirror surface angle in the horizontal direction of the mirror 72 is adjusted. Here, the slide block 90 whose projecting spherical portion 90b is connected to the recessed spherical portion 82 in the adjustment nut 28 by means of ball joint connection moves in the axial direction following the adjustment nut 28 while rotating around the axis relative to the adjustment nut 28 via a ball joint 119 in such a manner that rotation around the axis relative to the sensor case 95 is blocked by the engagement between the projections 90e and 90f of the bulge portion 90c and the guide grooves 108a and 108b at the wall surface of the empty space 108. The slide block 90 moves in a range in which the bulge portion 90c moves to positions indicated by reference numerals 92c' and 92c" in FIG. 1. A position in the axial direction of the slide block 90 relative to the actuator housing 12 is detected as a voltage value according to a contact position in the resistor 111 that is in contact with the slide contact 91, and a mirror surface angle in the horizontal direction of the mirror 72 is detected according to the voltage value.

Although in the above embodiment, the elongated protrusion 125 is provided on the sensor case 95 side, instead, it is possible that the elongated protrusion 125 is provided on the housing front 12A side or on each of the sensor case 95 side and the housing front 12A side. Also, although in the above embodiment, the wall 121 has a large diameter and the wall 123 has a small diameter, the diameter size relationship can be reversed so that the wall 121 has a small diameter and the wall 123 has a large diameter. In this case, the O ring 104 can be arranged in a space on the inner peripheral side of the wall 121 having a small diameter. Also, although in the embodiment, the slide blocks 90 and 92 are connected to the adjustment nuts 28 and 30, respectively, it is possible that the slide blocks 90 and 92 are biased by respective springs without being connected to the adjustment nuts 28 and 30 so that the slide blocks 90 and 92 press and abut against the respective far end surfaces at the bottoms of the empty spaces 76 in the adjustment nuts 28 and 30. Also, it is possible that the movers 90 and 92 are arranged at respective positions away from the adjustment nuts 28 and 30 (non-coaxial positions) and connected to the back surface of the tilting member 46 or are biased by respective springs without being connected to the back surface of the tilting member 46 so as to press and abut against the back surface of the tilting member 46.

What is claimed is:

1. A vehicle mirror apparatus comprising: a tilting device tilting a mirror to adjust a tilting angle of the mirror; and a mirror surface angle detection device detecting the tilting angle of the mirror, the tilting device including a base member, a tilting member supporting the mirror on a front side of the base member so as to be tiltable around a predetermined tilting center, and a drive device exerting a driving force between the base member and the tilting member to tilt the tilting member, the mirror surface angle detection device including a sensor case, a mover and a position detection device, the sensor case being attached to a back side of the base member, the mover including a rear end portion, a front end portion and a shaft portion between the rear end portion and the front end portion, the rear end portion being housed in the sensor case, the shaft portion being inserted through a hole formed in the sensor case, the front end portion projecting to an outside of the sensor case, the mover being arranged so as to be movable relative to the sensor case in an axial direction of the shaft portion, the front end portion projecting to the outside of the sensor case penetrating a hole formed in the base member and engaging with the tilting member, the mover moving in the axial direction of the shaft portion, following tilting of the tilting member, the position detection device being housed in the sensor case and detecting a position in an axial direction of the mover relative to the sensor case, the vehicle mirror apparatus further comprising a seal structure sealing a gap between the shaft portion of the mover and the hole in the sensor case, the seal structure including a ring-shaped seal member interposed between the sensor case and the base member on the shaft portion of the mover, the shaft portion projecting from the sensor case, passed through a center hole of the seal member, and a screw member screw-fastening the sensor case and the base member together to interconnect the sensor case and the base member, and bringing the seal member into pressure contact and holding the seal member between the sensor case and the base member via a force of the screw fastening.

2. The vehicle mirror apparatus according to claim 1, wherein the seal member having a flat shape including an outer peripheral-side part that is brought into pressure contact between the sensor case and the base member, and an inner peripheral-side part that is released from the pressure contact between the sensor case and the base member or is subject to pressure contact that is weaker than the pressure contact in the outer peripheral-side part.

3. The vehicle mirror apparatus according to claim 2, wherein the seal member includes a seal portion in the inner peripheral-side part, the seal portion having a circular shape in a cross-section taken along a plane extending through a center axis of the seal member, and an extension portion in the outer peripheral-side part, the extension portion having a plate-like shape, being thinner than the seal portion and extending outward from an outer peripheral edge portion of the seal portion.

4. The vehicle mirror apparatus according to claim 3, further comprising an elongated protrusion at a position in either or both of the sensor case and the base member where the outer peripheral-side part of the seal member is arranged, the elongated protrusion being formed coaxially with the outer peripheral-side part, and upon the sensor case and the base member being screw-fastened together via the screw member, pushing the outer peripheral-side part of the seal member.

5. The vehicle mirror apparatus according to claim 2, further comprising an elongated protrusion at a position in either or both of the sensor case and the base member where the outer peripheral-side part of the seal member is arranged, the elongated protrusion being formed coaxially with the outer peripheral-side part, and upon the sensor case and the base member being screw-fastened together via the screw member, pushing the outer peripheral-side part of the seal member.

6. The vehicle mirror apparatus according to claim 2, wherein the seal member includes a seal portion in the inner peripheral-side part, the seal portion having a circular shape in a cross-section taken along a plane extending through a center axis of the seal member, and an extension portion in the outer peripheral-side part, the extension portion having a plate-like shape, being thinner than the seal portion and extending outward from an outer peripheral edge portion of the seal portion;

wherein the seal structure further comprises an elongated protrusion at a position in either or both of the sensor case and the base member where the extension portion of the seal member is arranged, the elongated protrusion being formed coaxially with the extension portion, and upon the sensor case and the base member being screw-fastened together via the screw member, pushing the extension portion of the seal member; and wherein the elongated protrusion pushes a position partway in a radial direction of the extension portion.

7. The vehicle mirror apparatus according to claim 1, further comprising a wall on an outer peripheral side relative to a position in each of the sensor case and the base member where the seal member is arranged, the walls having mutually-different sizes, being formed coaxially with the position where the seal member is arranged, and being fitted together to mutually position the sensor case and the base member, wherein the seal member is arranged in a space on an inner peripheral side of a smaller one of the walls.

8. The vehicle mirror apparatus according to claim 1, wherein the screw member includes a plurality of screw members arranged at respective positions with the shaft portion interposed therebetween, the plurality of screw members screw-fastening the sensor case and the base member together in a direction parallel to the shaft portion to interconnect the sensor case and the base member.

9. The vehicle mirror apparatus according to claim 1,
wherein the sensor case includes a case body, and a case cover that occludes an opening of the case body; and
wherein the screw member interconnects the case body, the case cover and the base member.

* * * * *